US005530242A

United States Patent [19]
Genovese

[11] Patent Number: 5,530,242
[45] Date of Patent: Jun. 25, 1996

[54] FIBER OPTIC SCANNING BEAM DETECTOR WITH START-OF-SCAN DETECTION

[75] Inventor: Frank C. Genovese, Fairport, N.Y.

[73] Assignee: Xerox Corporation, Stamford, Conn.

[21] Appl. No.: 387,643

[22] Filed: Feb. 13, 1995

[51] Int. Cl.⁶ ............................. G02B 6/00; B41J 2/435
[52] U.S. Cl. .......................... 250/234; 347/235; 347/25; 250/227.11
[58] Field of Search ..................... 250/234, 235, 250/236, 214 R, 208.2, 227.11; 347/235, 233, 234, 236, 250

[56] References Cited

U.S. PATENT DOCUMENTS

| | | | |
|---|---|---|---|
| 4,071,754 | 1/1978 | Roulund | 250/227 |
| 4,386,272 | 5/1983 | Check, Jr. et al. | 250/236 |
| 5,257,048 | 10/1993 | Genovese | 347/137 |
| 5,319,393 | 6/1994 | Genovese | 347/132 |
| 5,428,808 | 6/1995 | Sawase et al. | 375/800 |
| 5,438,354 | 8/1995 | Genovese | 347/256 |

Primary Examiner—Edward P. Westin
Assistant Examiner—John R. Lee

[57] ABSTRACT

A fiber optic system is used in a laser ROS scanning system to generate a start of scan signal. In one embodiment, a single optical fiber is positioned at the beginning of a scan line sweep. The fiber transmits a portion of a scan beam energy to a photodetector located on a main electronics system board. The photodiode generates an output signal which is sent as an input to a high speed comparator. A second input to the comparator is a second signal derived from said first signal but having a lower amplitude. The comparator compares two wave forms and generates a sharp electrical transition at the precise time the two wave forms cross which, in preferred embodiment, occurs when the first wave form amplitude level falls to about ½ of maximum. The comparator output is used to initiate the SOS signal of a laser diode ROS.

7 Claims, 5 Drawing Sheets

FIG. 3A
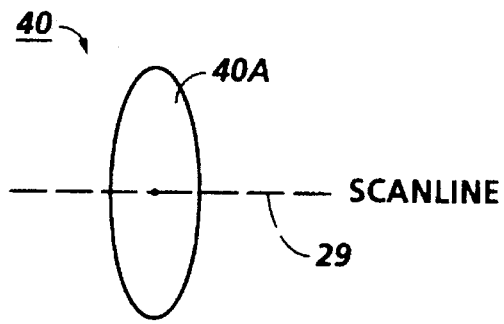
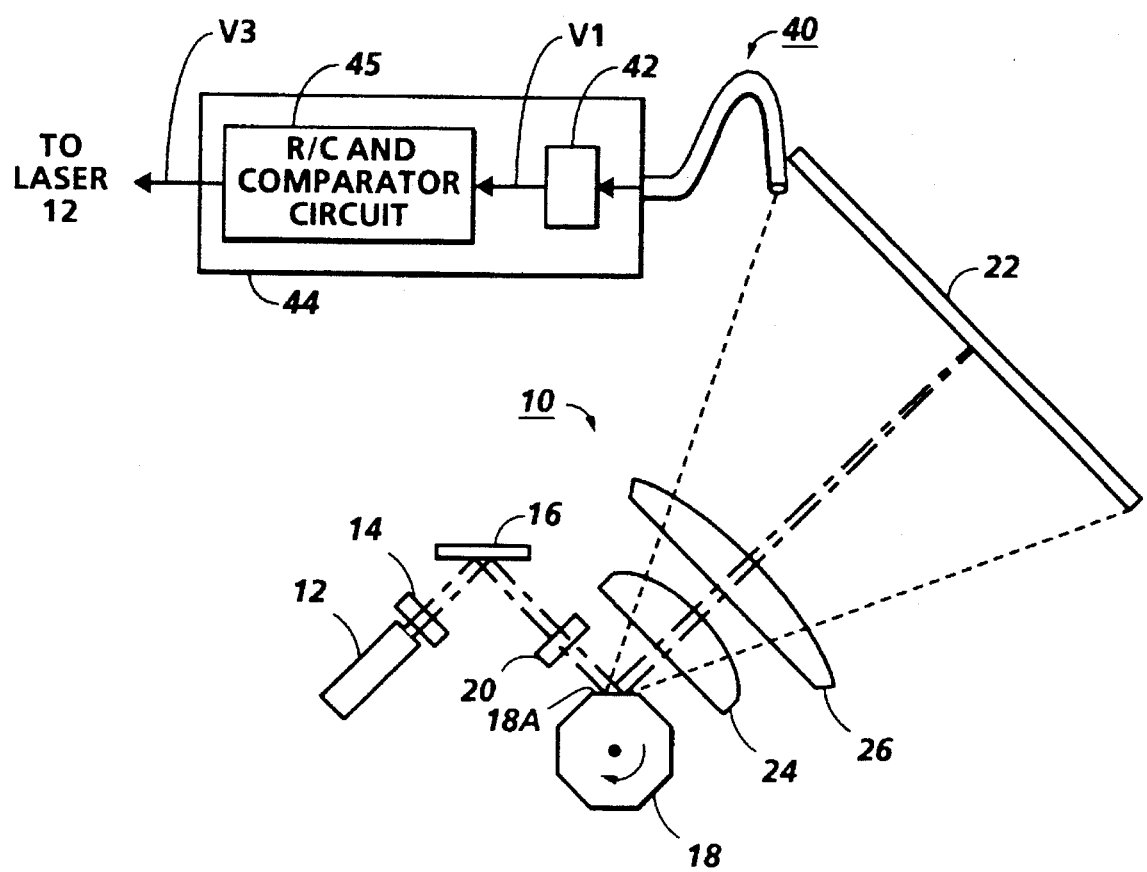
FIG. 3

FIBER OPTIC SCANNING BEAM DETECTOR WITH START-OF-SCAN DETECTION

BACKGROUND AND MATERIAL DISCLOSURE STATEMENT

The invention broadly relates to a Raster Output Scanner (ROS) imaging system, and, more particularly, to a means and method for generating timing signals responsive to the detection of a scanning beam crossing a fiber optic detector.

In conventional ROS systems, an intensity modulated light beam generated by a gas or diode laser is repetitively scanned across the surface of a photosensitive image plane to form a latent image of a document or the like represented by input binary data. Each scan line comprises composite images of individual pixels representing on and off states of the laser. These pixels must be aligned from scan to scan in the vertical or fastscan direction; failure to do so results in the phenomenon known as scan line "jitter". It is known in the prior art that photodetectors can be positioned in the scan path a predetermined distance upstream from the recording surface where their output is used to generate a Start Of Scan (SOS) signal controlling the timing of the laser modulation wave form. Exemplary of the known detectors is a slit detector design in which the amplitude of the photodiode output signal is compared with a predetermined fixed reference voltage. When the scanned laser beam passes over the photodetector surface, the amplitude of the output signal reaches this reference threshold and an SOS pulse is generated. Also known is the so-called differential input or split detector which utilizes dual photodiode elements in very close proximity in an electronic comparator configuration that compensates for variations in scanning beam power. In operation, the sweep of the beam over the first detector establishes a dynamic reference level for the second detector that is proportional to the intensity of the scanned light beam. With this arrangement, the comparator is triggered when the swept beam is positioned at the midpoint between the detectors and the light levels in both detectors match exactly. An example of a split detector is disclosed in U.S. Pat. No. 4,386,272.

For many high speed, high resolution Raster Output Scanner (ROS) systems, a solid state laser diode or a HeNe laser is the preferred device for generating the recording beams. As is well known, the power output of these lasers varies in amplitude over time. The conventional slit detector, when used with a laser scanning system, is subject to jitter because the output current of the photodetector responds proportionately, in amplitude, to the Gaussian shape of the scanned beam as it sweeps across the face of the detector. Outputs produced by beams of different power levels will, necessarily, reach the fixed reference level at different relative times, resulting in SOS outputs at different times relative to passage of the center of a scanned Gaussian beam. Since the synchronization of the electronic system that controls the timing of the information bit stream defining the laser modulation wave forms for each line is keyed to the SOS pulse, this differential triggering effects a net translation of the exposure pattern of each scan line in the fast scan direction. As a result, the alignment of picture elements in the exposure raster from line to line is inexact.

The differential or split detector generates an SOS output when the Gaussian beam is centered between the two photodetector sites. Since the response depends only on the relative position of the beam and not on a specific amplitude level, the SOS output signal timing is independent of the beam power. In other words, the split detector generates an SOS signal which does not vary in time when the diode intensity changes. Both the slit detector and the split detector are typically configured in the same fashion; the photodetector elements and associated amplifiers and pulse shaping electronics are assembled in a remote housing which is positioned adjacent to the imaging surface in or very close to the focal plane path of the scanned beam. SOS pulses from the detector assembly are returned via coaxial cable or twisted pair to a central electronic network containing the image data, system timing, and laser modulation circuitry.

A third detection method is known in the art wherein the position of a scanning laser beam is sensed by placing an optical fiber or light pipe in the path of the scanning beam to transmit the incident light to the central electronics system. The conveyed light energy is incident on an indicia as, for example, disclosed in U.S. Pat. No. 4,071,754, or on a photodetector, located on a central circuit board of the electronics system. The detector converts the light energy into an electrical signal which is then processed to provide synchronization signals for the laser. See also the fiber optic detector disclosed in co-pending application Ser. No. 08/217,822, filed on 25 Mar. 1994, entitled, "FIBER OPTIC SCANNING BEAM DETECTOR" and now U.S. Pat. No. 5,444,293, assigned to the same assignee as the present invention. The system disclosed in this application uses a single optical fiber positioned in the scan path at the beginning of a scan line sweep. The fiber transmits a portion of the scan beam flux to a photodetector located on a central electronics circuit board. The photodiode generates an output signal which drives one input of a high speed comparator. The second comparator input is fed an amplified and delayed analog of the photodetector output signal. The comparator senses the difference in the two output wave forms and generates an output transition signal at the precise time the two wave forms cross over or intersect. The comparator output transition signal is used to initiate the scanning system SOS signal of a gas or laser diode ROS.

Fiber optic detectors have several advantages over the split and slit detector arrangements; they are more compact, less expensive, provide superior noise immunity and have simple mechanical mounting. Lower cost is realized because separate scan detector circuit boards and housings are not needed and because the cable and connectors that provide power and signals to and from the remote scan detector board are unnecessary. A dual element photodiode comprising a pair of closely spaced photosensitive elements in a common package suitable for use in a split detection design is also more expensive than an equivalent single element photodiode device. Noise immunity is superior because the laser printer environment is electrically noisy (EMI, RFI) and the remote scan detector and its cables are difficult to shield from this noisy environment. The optical fiber simply acts as a light flux conduit through the noisy environment to the main system electronics board where the light signal is converted to an electronic signal in a controlled environment (shielded) where signal traces are short and noise is easier to control. Further, the mechanical mounting of the remote detector system is often awkward because the scanner footprint is typically narrow near the ROS image plane and the space available for the scan detector electronics board is relatively cramped.

It would be desirable to use a single channel optical fiber detection system which employs less complex circuitry than that required in the prior art. An embodiment is therefore disclosed which is directed to a means and method for generating a start of scan signal using a single fiber optic detection channel which functions much as a differential or split detector, but which does not require linear pulse delay circuitry to create an undistorted delayed analog of a first detected signal. This SOS signal generation is accomplished by using a single optical fiber or light pipe coupled with circuitry that forms a voltage wave form which is intersected or crossed over by the trailing edge of the initially detected signal wave form. More particularly the present invention relates-to a fiber optic scanning beam detector comprising:

fiber optic means positioned in the path of a periodically sweeping beam of light, said fiber optic means transmitting all or a portion of said intercepted light to a photodetector thereby causing said photodetector to generate a voltage wave form V1 having a leading and trailing edge and amplitude A corresponding to the intensity of said intercepted light, circuit means for forming a second voltage wave form V2, having a leading edge, extended decay, and peak amplitude B proportionately less than that of amplitude A of wave form V1, and comparator means for comparing said first and second voltage wave forms V1 and V2 and for generating an output transition signal V3, upon detection of the trailing edge of V1 crossing V2.

BRIEF DESCRIPTION OF THE DRAWINGS

FIG. 3 is a top view of a modified version of the scanner of FIG. 1.

FIG. 3A is an enlarged view of the aperture of the optical fiber shown in FIG. 3.

DESCRIPTION OF THE INVENTION

Figure 1:
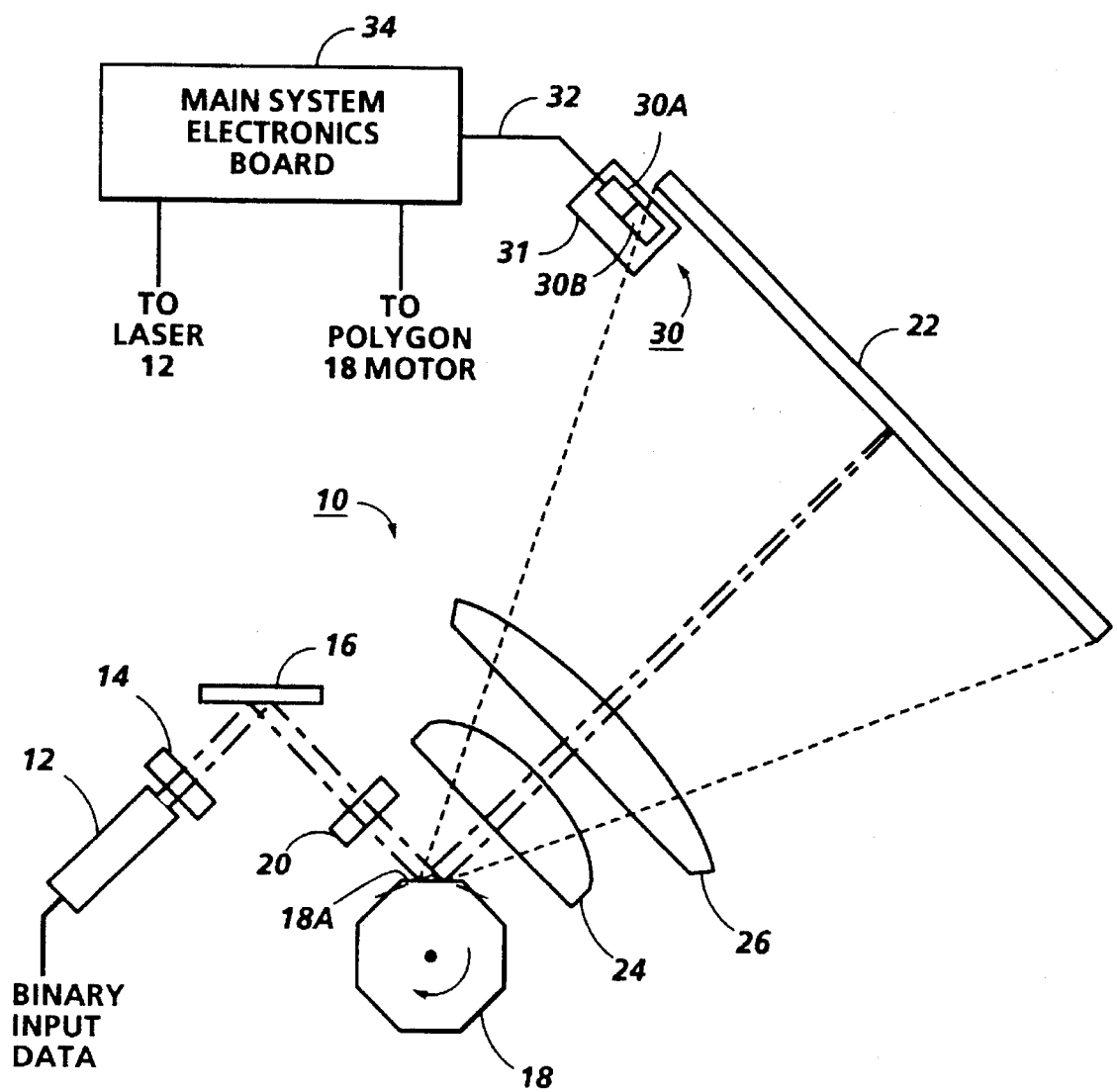
FIG. 1 is a top view, in the tangential plane, of a prior art ROS scanner using a diode laser and split detector for SOS detection.

FIG. 1 is a top view of a prior art laser diode ROS scanner which utilizes a conventional split detector to generate an SOS signal. Referring to FIG. 1, scanner 10 comprises a modulated diode laser 12 which receives binary input image data from a source not shown, but conventional in the art; e.g., a RIS scanner, a computer, etc. Optical element 14 provides conventional beam expansion and collimation of the modulated output of laser 12. The collimated output from element 14 is reflected by folding mirror 16 and is focused onto facets of rotating polygon 18, by a positive cylindrical lens 20 also used to optically correct for polygon-induced sagittal beam position error, (wobble error). The reflected rays from a facet, e.g. facet 18A of polygon 18 are focused in the fast scan direction (tangential plane) at image plane 22 by Fθ lens elements 24, 26.

Figure 2:
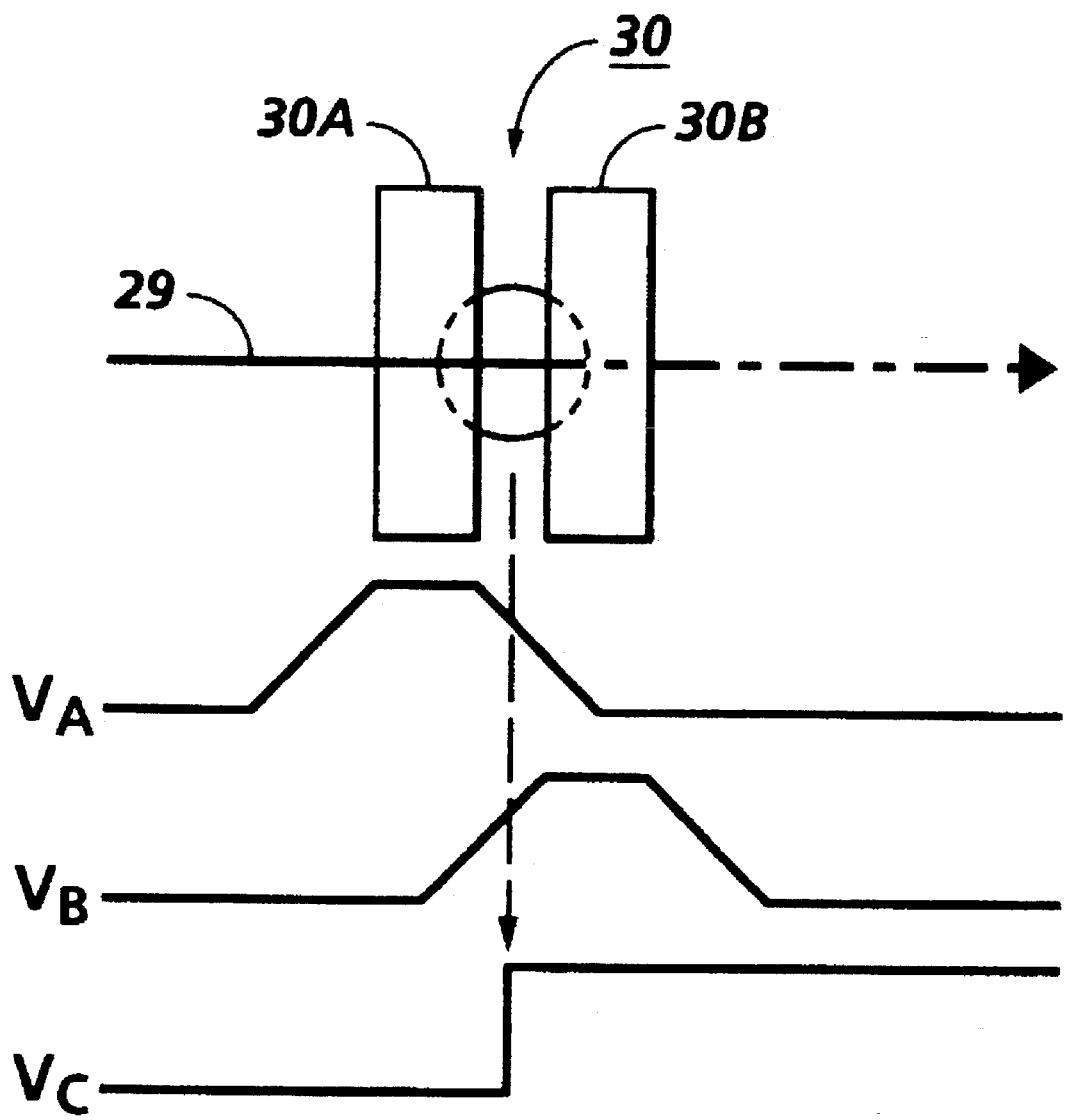
FIG. 2 shows the voltage wave forms generated by the split detector of FIG. 1.

As the beam scans across image plane 22, light strikes the active elements of split photodetector 30 mounted on remote scan detector board 31. FIG. 2 shows the split photodetector 30 and the wave forms $V_A$, $V_B$ generated when the scanning beam 29 excites the elements of the photodetector.

In the split photodetector system there are dual photosites 30A, 30B separated by a narrow space. Each photosite is connected as a separate photodiode element that generates a photocurrent proportional to the absorbed incident light flux of scanning beam 29 resulting in two separate voltage wave forms ($V_A$, $V_B$) similar in every respect except that they are separated by a time delay due to the relative displacement of the two photosensitive elements along the beam path. $V_A$ and $V_B$ drive the differential inputs of a high speed analog comparator that generates a fast logic transition or voltage wave form edge when the two inputs cross over from the initial condition where $V_A \geq V_B$ to the condition $V_B \leq V_A$. Since the transition is initiated at the crossover point where $V_A = V_B$, the timing of the resulting output transition signal ($V_c$) is independent of beam intensity, and relatively insensitive to changes in spot focus as well as the scanning speed of beam 29 exciting photodetector 30. It will be understood by those familiar with the electronic art that since the condition of the comparator output is undefined for those periods where both $V_A$ and $V_B$ are zero, additional enabling conditions and timing circuitry are typically provided by the central electronic system control loop which also standardizes the SOS pulse width. This split detector system illustrates the aforementioned problem since photodetector 30 and the comparator, including any required amplification circuitry, is typically installed on a remote board 31 adjacent to the imaging surface; the wave forms $V_A$ and $V_B$ are generated in a noisy environment and either the raw wave forms or the comparator output must be transmitted back to the main system electronics board 34 (FIG. 1) to complete the timing feedback loop.

According to the invention, a single channel fiber photodetector signal system with differential detection characteristics is realized by positioning an optical fiber at the SOS location and transmitting the incident light energy to a single photodetector element located on the main system electronics board. In the preferred embodiment, a low cost plastic optical fiber or light pipe material, such as that manufactured by DuPont and sold under the trade name Crofon®, is used to conduct the light flux to the photodetection device. Plastic optical fiber of diameter 5 mils or more is convenient because it can be thermoplastically reshaped as needed and is relatively easy to process in a mass production environment. While a single optical fiber is shown, it will be understood that multiple fibers bundled incoherently together may also be used.

Figure 4:
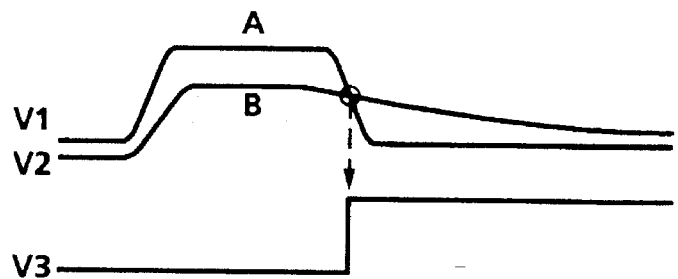
FIG. 4 shows the voltage wave forms generated by the SOS detection system shown in FIG. 3.

The detection circuitry is designed to produce two separate voltage wave forms V1, V2 (FIG. 4) which perform functions similar to wave forms $V_A$, $V_B$ of the prior art split detector. Wave form V1 is the direct linear response to flux transmitted through the optical fiber and is proportional to the absorbed light flux incident on the single photodetector element; wave form V2 is derived from V1 and has a proportionately lower amplitude as will be seen. FIG. 3 shows the prior art system of FIG. 1 modified by replacing split detector 30 on board 31 with a light pipe or optical fiber 40. FIG. 4 shows the wave forms V1, V2 generated when scanning beam 29 crosses aperture 40A of fiber 40, (FIG. 3A) as a result of light flux transmitted to single element photodetector 42 mounted on main system electronic board 44. Fiber 40 has an aperture 40A optionally shaped as an oval as shown in FIG. 3A with a width of approximately 5 mils. For a typical mid-volume ROS, beam 29 has a spot diameter of 30 to 40 microns and a scan speed of about 1 micron/nanosecond. Wave form V1 thus has a transition time of about 30 to 40 nanoseconds and a dwell time of about 0.125 micro seconds as the exposing spot scans across aperture 40A.

Figure 5:
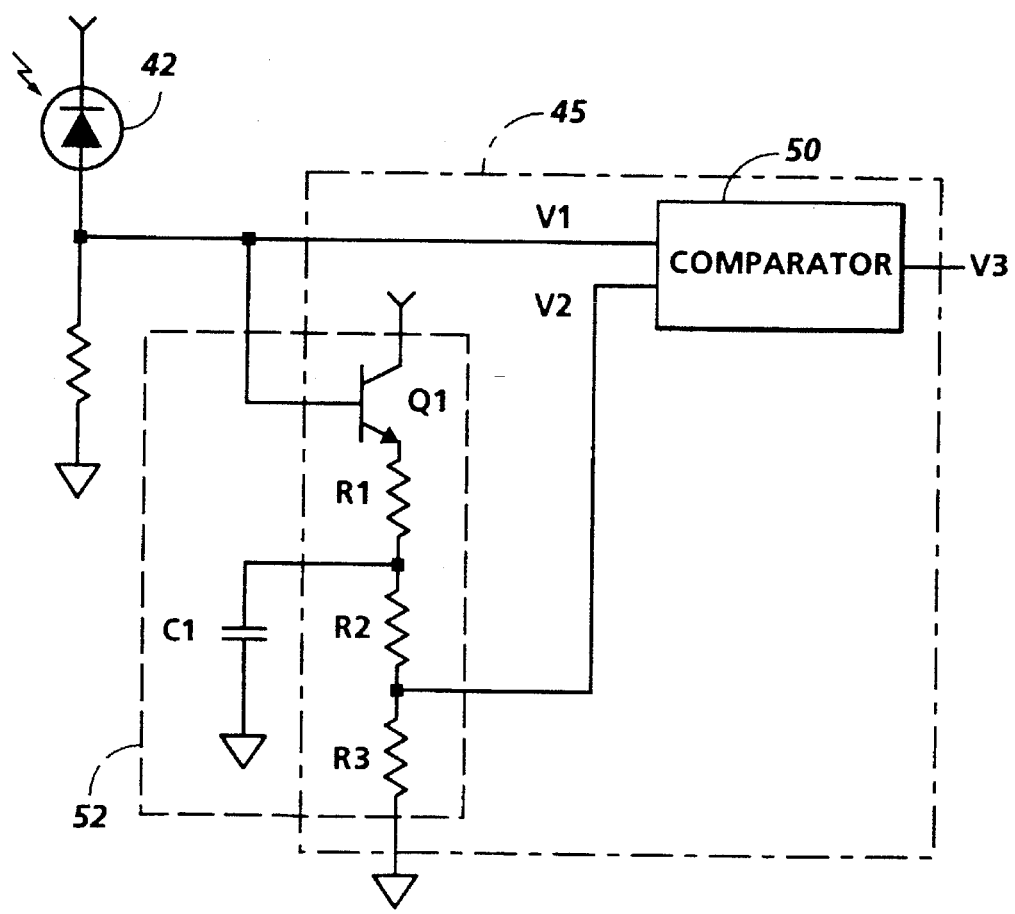
FIG. 5 shows circuitry used to generate a second wave form of lower amplitude following generation of a first wave form.

V1 directly drives one input of high speed voltage comparator 50 in comparator circuit 45 shown in greater detail in FIG. 5 and also drives buffered RC circuit 52, with V2 applied to the second input of comparator 50. In the simplified circuit of FIG. 5, V1 is applied to the base of transistor Q1 configured as an emitter-follower driving the resistor string R1, R2, and R3, with parallel capacitor C1. After several time constants of RC network 52, V2 settles to a value of $(V1-V_{eb})R3/(R1+R2+R3)$, where $V_{eb}$ is the emitter base voltage offset of Q1 (about 0.7 volt). The value of (optional) resistor R1 is relatively small (about 20 Ohms) and is intended to protect Q1 by limiting the maximum charging current in C1. Resistors R1 and R2 are made approximately equal so that the output voltage V2 settles to $(V1_{peak}-V_{eb})/2$ or 50% of the peak of V1 in the absence of $V_{eb}$. For a Gaussian beam response, the 50% factor establishes the peak voltage of V2 equal to the voltage of V1 at its steepest slope. As shown in FIG. 4, the long exponential decay due to capacitor C1 maintains the value of V2 past the falling edge of V1 so that crossover takes place at the point of steepest slope and hence minimum timing uncertainty.

Figure 6:
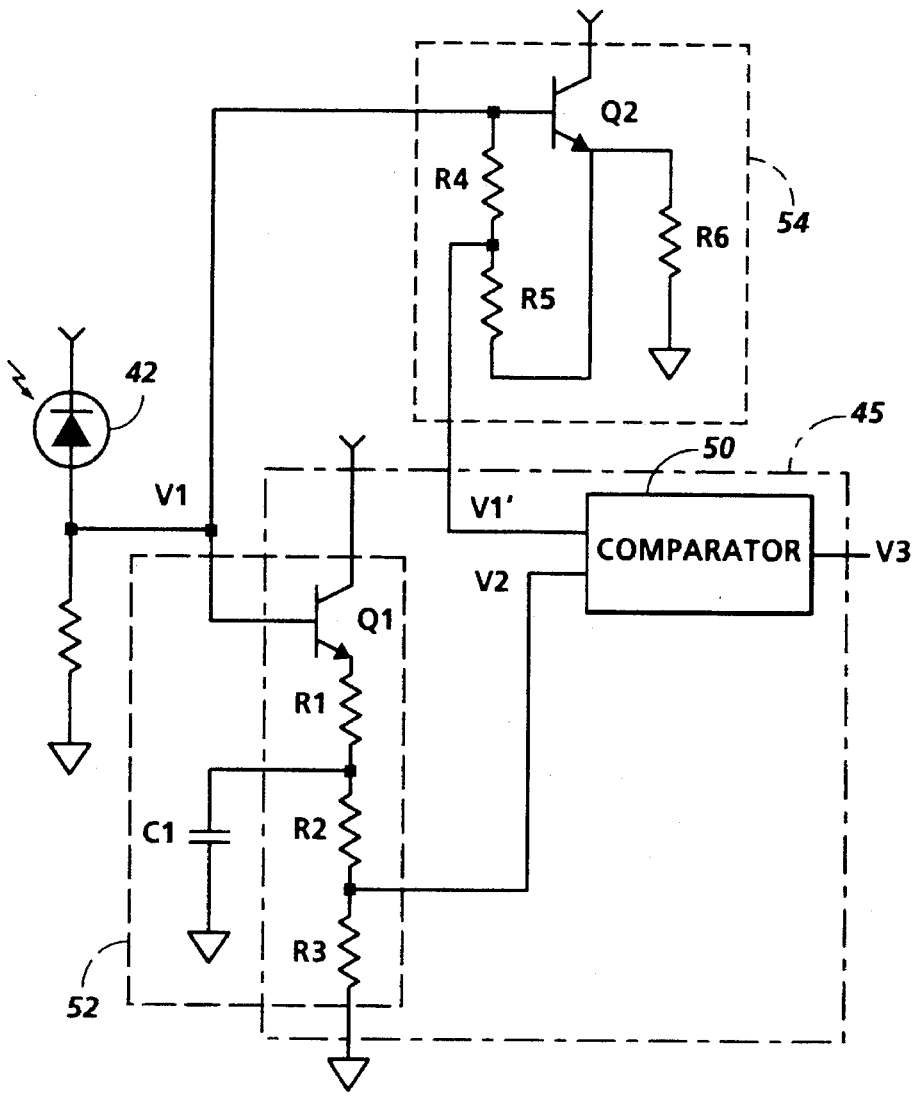
FIG. 6 is a second embodiment of the circuitry of FIG. 5.
Figure 7:
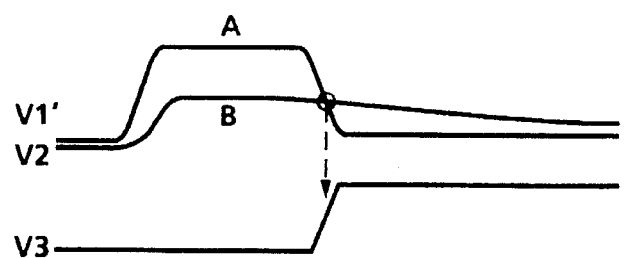
FIG. 7 shows the output signals from the second embodiment.

It will be clear to those familiar with the electronic art that the wave form V2 begins to decay in advance of the crossover condition V1=V2. However, for a C circuit 52 with time constant of about 8 microseconds (C1=.001 microfarad, R2=R3=3.9K Ohm), V2 decays only about 0.25% during this 20 nanosecond delay. It is also seen that the $V_{eb}$ offset in the simplified circuit of FIG. 5 shifts the crossover away from the 50% point. FIG. 6 shows a variation of the FIG. 5 circuit where the emitterbase voltage drop of a second transistor Q2 in circuit 54 has been employed to compensate for the $V_{eb}$ offset of V1. Here Q2 is biassed at the same operating current as Q1; if both transistors are a matched pair on a common substrate in a so-called "dual" package, the difference in $V_{eb}$ due to temperature and other effects will typically be less than 5 millivolts. Assuming R4=R5=2.7K Ohm and (R6=5.1K Ohm), and the same RC network values as in FIG. 4, the crossover condition in the circuit of FIG. 5 is reached when $(V1_{peak}-V_{eb})/2=V1-(V_{eb}/2)$, or equivalently $V1_{peak}/2=V1'$, i.,e., when V1 has fallen to 50% of its peak value (within one or two millivolts). Since most fast photodiode detectors in a typical SOS application generate a relatively small photocurrent, photodetector 42, shown for simplicity in FIGS. 4 and 5 as the source of V1, may include a fast linear preamplifier to raise the amplitude of the input signal to a more reasonable voltage range for comparator circuit 45 without degrading performance. In addition, it will be understood that the choice of ratios for resistors R2 and R3 as well as resistors R4 and R5 can be adjusted as needed in order to optimize the crossover point for a particular input wave form V1 which may not be Gaussian.

While the embodiment disclosed herein is preferred, it will be appreciated from this teaching that various alternative, modifications, variations or improvements therein may be made by those skilled in the art, which are intended to be encompassed by the following claims:

What is claimed is:

1. A fiber optic scanning beam detector comprising:

fiber optic means positioned in the path of a periodically sweeping beam of light, said fiber optic means transmitting all or a portion of any intercepted light to a photodetector thereby causing said photodetector to generate a voltage wave form V1 having a leading edge and a trailing edge and an amplitude A corresponding to the intensity of any intercepted light, circuit means for forming a second voltage wave form V2, having a leading edge, extended decay, and peak amplitude B proportionately less than that of amplitude A of wave form V1, and comparator means for comparing said first and second voltage wave forms V1 and V2 and for generating an output transition signal V3, upon detection of the trailing edge of V1 crossing V2.

2. The detector of claim 1 wherein said crossing occurs at a position of the trailing edge of V1 expressed by the value A÷2.

3. The detector of claim 1 wherein said circuit means includes an RC network for forming V2.

4. The detector of claim 2, wherein V1 is applied to the base of a transistor whose output drives the RC network and wherein V2 is defined by the value $(V1_{peak}-V_{eb})/2$ where $V_{eb}$ is the emitted by the voltage of the transistor.

5. The detector of claim 4, wherein V1 is further applied to a second transistor which compensates for the $V_{eb}$ value.

6. Apparatus for detecting a scanning beam of radiant energy from a radiant energy source at a predetermined position adjacent a recording medium and along a scanning beam path and for providing a feedback signal to said radiant energy source which is used for establishing a start of scan position of said scanning beam on said recording medium, said apparatus comprising:

at least one optical fiber with a light receiving end positioned at said predetermined position, said scanning beam entering said fiber receiving end and propagating through said fiber to an exit end of said fiber, a photodetector positioned so as to intercept the light from said fiber exit end, said photodetector providing a voltage wave form V1 having a leading edge and a trailing edge and an amplitude A corresponding to the intensity of the intercepted light, circuit means for dividing said voltage V1 to form a second voltage wave form V2, having a leading edge, extended decay and peak amplitude B proportionately less than that of amplitude A and a comparator means for comparing V1 and V2 and for generating a third output transition signal V3, upon detection of the trailing edge of V1 crossing V2.

7. The apparatus of claim 6, wherein said radiant energy source is a laser diode and wherein said wave form V3 does not vary in time with scanning intensity changes of said laser diode.

* * * * *